(12) United States Patent
Person (10) Patent No.: US 11,932,340 B2
(45) Date of Patent: Mar. 19, 2024

(54) SUSPENSION PRE-LOAD MANAGEMENT SYSTEM

(71) Applicant: Robert Bosch GmbH, Stuttgart (DE)

(72) Inventor: Kurt Person, Florence, WI (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 636 days.

(21) Appl. No.: 17/111,859

(22) Filed: Dec. 4, 2020

(65) Prior Publication Data

US 2022/0177066 A1 Jun. 9, 2022

(51) Int. Cl.
*B62J 45/20* (2020.01)
*B62J 45/41* (2020.01)
(Continued)

(52) U.S. Cl.
CPC .............. *B62J 45/20* (2020.02); *B62J 45/41* (2020.02); *B62K 25/04* (2013.01); *B62L 3/00* (2013.01); *F16F 9/16* (2013.01); *B60G 2300/12* (2013.01); *B62K 2025/045* (2013.01); *F16F 2230/18* (2013.01); *F16F 2230/22* (2013.01)

(58) Field of Classification Search
CPC ........... B62J 45/20; B62J 45/41; B62K 25/04; B62K 2025/045; B62K 25/283; B62K 25/08; B62K 2025/044; B62K 2025/048; B62L 3/00; F16F 9/16; F16F 2230/18; F16F 2230/22; F16F 9/46; F16F 2230/183; F16F 13/007; B60G 2300/12; B60G 2400/50; B60G 17/08; B60G 17/0408;
(Continued)

(56) References Cited

U.S. PATENT DOCUMENTS

| 5,123,671 A | * | 6/1992 | Driessen | B60G 17/018 |
| | | | | 188/266.8 |
| 6,679,504 B2 | * | 1/2004 | Delorenzis | F16F 5/00 |
| | | | | 280/5.512 |

(Continued)

FOREIGN PATENT DOCUMENTS

DE 10109555 A1 * 9/2002 ......... B60G 17/0272

OTHER PUBLICATIONS

Bleichier et al., Suspension Strut With Adjustable Preload, Sep. 5, 2002, EPO, DE 101 09 555 A1, Machine Translation of Description (Year: 2002).*

(Continued)

*Primary Examiner* — Paul N Dickson
*Assistant Examiner* — Shams Dhanani
(74) *Attorney, Agent, or Firm* — David Kovacek (57) ABSTRACT

A vehicle suspension pre-load management system is disclosed. At least one suspension component, such as a motorcycle shock absorber, has an expandable chamber that with increased volume of a nearly incompressible fluid increases the suspensions pre-load. In one embodiment the system utilizes a controller, a pressure sensor, a pump, and a number of solenoids in a manifold block to allow a user to set a desired pre-load level. In another embodiment the controller monitors the pressure of the chamber and maintains a desired pre-load setting. In yet another embodiment, the controller identifies a hard braking event such that would cause a brake dive and increases the pre-load to counter act the dive.

9 Claims, 2 Drawing Sheets (51) Int. Cl.
  *B62K 25/04* (2006.01)
  *B62L 3/00* (2006.01)
  *F16F 9/16* (2006.01)

(58) Field of Classification Search
  CPC .......... B60G 2202/24; B60G 2202/416; B60G 2500/10; B60G 2800/22
  See application file for complete search history.

(56) References Cited

U.S. PATENT DOCUMENTS

| | | | | |
|---|---|---|---|---|
| 6,923,453 | B2* | 8/2005 | Pivac | B60G 17/005 |
| | | | | 280/5.506 |
| 8,091,910 | B2* | 1/2012 | Hara | B62K 25/04 |
| | | | | 280/283 |
| 8,256,589 | B2* | 9/2012 | Seidl | B60G 15/065 |
| | | | | 267/225 |
| 11,001,120 | B2* | 5/2021 | Cox | B60G 17/0152 |
| 2011/0214956 | A1* | 9/2011 | Marking | F16F 9/34 |
| | | | | 188/313 |
| 2013/0328277 | A1* | 12/2013 | Ryan | B60G 17/0165 |
| | | | | 280/5.519 |
| 2014/0125018 | A1* | 5/2014 | Brady | B60G 17/016 |
| | | | | 280/5.519 |
| 2015/0081171 | A1* | 3/2015 | Ericksen | F16F 9/5126 |
| | | | | 701/37 |
| 2018/0010666 | A1* | 1/2018 | Marking | B60G 13/06 |
| 2020/0030755 | A1 | 1/2020 | Hardy | |
| 2020/0140032 | A1* | 5/2020 | Tseng | B62J 99/00 |
| 2021/0268857 | A1* | 9/2021 | D'Orazio | B60G 15/062 |

OTHER PUBLICATIONS

JRi Hydraulic Ride Height, Installation Manual, www.jrishocks.com, Jan. 22, 2019.

* cited by examiner

SUSPENSION PRE-LOAD MANAGEMENT SYSTEM

TECHNICAL FIELD

This disclosure relates to vehicle suspensions, and more specifically to the adjustability of a suspension member pre-load.

BACKGROUND

A motorcycle's suspension serves a dual purpose: contributing to the vehicle's handling and braking, and providing safety and comfort by keeping the vehicle's passengers comfortably isolated from road noise, bumps and vibrations. A typical motorcycle has a pair of fork tubes for the front suspension, also known telescopic forks, and a swingarm with one or two shock absorbers, or simply referred to as shocks, for the rear suspension, although other configurations have been known to be utilized.

The top of the front forks are connected to the motorcycle's frame in a triple tree clamp, or yoke, which allows the forks to be turned in order to steer the motorcycle. The bottom of the front forks are connected to the front wheel's axle. The forks are typically designed with large hydraulic shocks having internal coil springs that are hydraulically damped with oil. They allow the front wheel to react to imperfections in the road while isolating the rest of the motorcycle from that motion.

In a swingarm configuration, the swingman is connected to the motorcycle's frame with bearings on one end so that it can pivot, and on the other end is the rear axle around which the rear wheel turns. The swingarm is also connected to the motorcycle's frame, or rear sub-frame, with one or two shocks usually with coil-over springs. These rear shocks, like the front shocks, allow the rear wheel to react to imperfections in the road while isolating the rest of the motorcycle from that motion.

Most motorcycle suspensions are designed so that the springs of the shocks are always under compression, even when fully extended. Pre-load is used to adjust the initial position of the suspension with the weight of the motorcycle and rider acting on it. The difference between the fully extended length of the suspension and the length compressed by the weight of the motorcycle and rider(s)/load is sometimes called total sag, or race sag. Total sag is set to optimize the initial position of the suspension to avoid bottoming out or topping out under normal riding conditions. Bottoming out occurs when the suspension is compressed to the point where it mechanically cannot compress any more. Topping out occurs when the suspension extends fully and cannot mechanically extend any more. Increasing pre-load increases the initial force on the spring thereby reducing total sag. Decreasing pre-load decreases the initial force in the spring thereby increasing total sag.

Some motorcycles allow adjustment of pre-load. Earlier pre-load adjustments where mechanical in nature having a collar adjacent the spring with a staircase of steps or grooves to physically increase or decrease spring pre-load by rotating the collar with a spanner wrench. Some motorcycles move the collar by changing an air pressure inside the forks. In these systems, valves at the top of the forks allow air to be added or released from the fork with more air pressure giving more pre-load, and less air pressure reducing pre-load.

More pre-load may be more desirable for on-road performance, as more pre-load generally reduces brake dive during braking, whereas less pre-load may be more desirable in some off-road conditions to reduce vibration to the rider. Similarly, more pre-load may be more desirable for heavier loads, and less pre-load may be more desirable for lighter loads. As mentioned above, pre-load may be adjusted with some suspension systems, but with those systems, the vehicle must stop and a spanner wrench pulled out or an air compressor. Thus it would be advantageous to have a portable system that could allow for conveniently changing the pre-load of a motorcycle if, and when, desired. Similarly, it may be even more desirable to modulate the pre-load while riding.

SUMMARY

One aspect of this disclosure is directed to a system that is capable of adjusting the pre-load of a shock absorber. In this aspect, the pre-load adjustment is performed on a two-wheeled motorcycle, although other vehicle configurations could also be used. In this aspect, a shock absorber, also referred to simply as a shock, has an internal expandable chamber configured to correspondingly increase or decrease pre-load with increasing or decreasing of liquid within the chamber. The system also has a reservoir in fluid communication with the chamber configured to hold the liquid.

In this aspect a pump is in fluid communication with and disposed between the chamber and the reservoir. The pump is configured to move liquid from the reservoir to the chamber. This system utilizes a controller, which is in communication with the pump to, upon receiving an activation signal, engage the pump to move liquid into the chamber. The controller may also use the pump to move liquid out of the chamber, although gravity in combination with the weight of the motorcycle may also accomplish this. Moving liquid into the chamber of the shock increases the pre-load of the shock. Moving liquid out of the chamber of the shock decreases pre-load of the shock. Thus the controller is capable of engaging the pump and adjusting the pre-load of the shock on command.

This system may also include a user interface in communication with the controller. The user interface may be used by a user/rider to adjust the pre-load of the shock. The user may make a selection of a pre-load setting, or simply request greater pre-load, and an activation signal may be sent from the user interface to the controller to engage the pump.

The system may also be automated. One way to accomplish some level of automation is to use a pressure sensor in fluid communication with the chamber. The pressure sensor may be configured to send a pressure signal to the controller. The pressure signal may represent the pressure in the chamber and may correspond to a pre-load setting. The controller then may be configured to, upon receiving a pressure signal indicating a drop of pressure from a threshold level, engage the pump to move liquid into the chamber, thus automating the system.

The user interface may provide the user with a number of pre-load threshold values. The number of threshold values may correspond to pre-load levels desired for on-road riding versus off-road riding, performance riding versus easy-riding, or loaded versus and un-loaded riding. These settings may also be derived from sensors on the motorcycle, and the system may be allowed to automatically adjust pre-load when the vehicle is being used in such environments or in such ways.

Motorcycles have a braking system, and in this aspect the braking system may be capable of sending a braking signal to the controller to indicate when the motorcycle is being braked. In response to this activation signal, the controller may engage the pump to increase liquid in the shock, thus increasing pre-load and reducing brake dive.

This aspect may be further refined by describing the pump as having an inlet and an outlet. The system may also use solenoid valves to restrict or allow flow of the liquid in the system. The solenoid valves are in communication with the controller allowing the controller to control when certain liquid pathways allow flow. One such solenoid valve may be in fluid communication with and disposed between the outlet of the pump and the chamber. This solenoid valve may be configured to, when closed by the controller, separate liquid flow from the outlet of the pump to the chamber.

Another such solenoid valve may be placed between the chamber and the inlet of the pump. In this configuration, the solenoid valve, when closed by the controller, may separate flow from the chamber to the inlet of the pump. Yet another solenoid valve may be placed between the reservoir and the inlet of the pump. In this configuration, the solenoid valve, when closed by the controller, may separate liquid flow from the reservoir to the inlet of the pump. And yet even another solenoid valve may be placed between the outlet of the pump and the reservoir. In this configuration the solenoid valve, when closed by the controller, may separate liquid flow from the outlet of the pump to the reservoir. The control of these solenoid valves allows for precise control to and from the chamber as well as to and from the reservoir.

Another aspect of this disclosure is directed to a manifold block and controller sub-assembly. In this aspect, a pre-load adjusting apparatus for a shock absorber on a vehicle is disclosed. The shock absorber is capable of correspondingly increasing or decreasing pre-load with the increasing or decreasing of fluid to the shock absorber. And there is a reservoir external to the shock absorber for holding fluid reserves. The manifold block has a first port configured to be fluidly connect to the reservoir. The manifold block has a second port configured to be fluidly connected to the shock absorber. The manifold block also defines a number of fluid passages between the first and second ports.

In this aspect, a pump is at least partially disposed within the manifold block. This pump also has an inlet, or low pressure side, and an outlet, or high pressure side. The inlet and outlet of the pump are both in fluid communication with the number of fluid passages. The pump is configured to, when activated, move fluid in the number of fluid passages.

The manifold block holds a number of solenoid valves in the fluid passages. A first solenoid valve is fluidly disposed between the first port and the inlet of the pump. This solenoid valve is used to control fluid flow between the reservoir and the inlet of the pump. A second solenoid valve fluidly disposed between the outlet of the pump and the first port. This solenoid valve is configured to control fluid flow between the outlet of the pump and the reservoir. A third solenoid valve is fluidly disposed between the second port and the inlet of the pump. This solenoid valve is configured to control fluid flow between the shock absorber and the inlet of the pump. And a fourth solenoid valve is fluidly disposed in the number of fluid passages between the outlet of the pump and the second port. This solenoid valve is configured to control fluid flow between the outlet of the pump and the shock absorber. This array of solenoid valves between the first and second port may be referred to as a channel, or a first channel.

In this aspect, a pressure sensor is fluidly disposed in the number of fluid passages proximate the second port. In this location, it is configured to provide a pressure signal corresponding to a pressure of the fluid in the shock absorber. Then also this aspect has a controller in communication with the pressure sensor, the first, second, third, and fourth solenoid valves, and the pump. The controller is configured to receive signals and programmed to engage the solenoid valves and the pump to move fluid in the number of fluid passages to modulate and control the pre-load of the shock absorber.

The manifold block may also have a one-way check valve fluidly disposed between the third solenoid valve and the inlet of the pump. This solenoid allows flow in only one direction and may be used to prevent back flow thru the third solenoid valve to the second port.

This apparatus may be used with a two-wheeled vehicle, although other configurations are envisioned. On a two-wheeled vehicle, the shock absorber described above may be a front shock absorber connected to that first channel. This aspect also discloses a rear shock absorber.

The manifold block may have a third port configured to be fluidly connect to the reservoir. This may be the same reservoir, or a different reservoir. If the same reservoir, there may be a half wall separating the first and third ports if fluid gets low. The manifold block may then have a fourth port configured to be fluidly connected to the rear shock absorber. The manifold additionally defines a second number of fluid passages therebetween and in fluid communication with the pump, this is also referred to as a second channel. A manifold block having two such channels is referred to as a two-channel manifold block.

The second channel has a number of solenoid valves in fluid communication with the second number of fluid passages. A fifth solenoid valve may be fluidly disposed between the third port and the inlet of the pump to control fluid flow between the reservoir and the inlet of the pump. A sixth solenoid valve may be fluidly disposed between the outlet of the pump and the third port to control fluid flow between the outlet of the pump and the reservoir. A seventh solenoid valve may be fluidly disposed between the fourth port and the inlet of the pump to control fluid flow between the rear shock absorber and the inlet of the pump. And an eighth solenoid valve may be fluidly disposed between the outlet of the pump and the fourth port to control fluid flow between the outlet of the pump and the rear shock absorber.

A second pressure sensor may be fluidly disposed in the second number of fluid passages proximate the fourth port. This second pressure sensor then is configured to provide a pressure signal corresponding to a pressure of the fluid in the rear shock absorber.

The controller in this aspect is in communication with the second pressure sensor, all of the solenoid valves, and the pump, and is configured to receive signals and engage the solenoids and pump to move fluid in the second number of fluid passages to modulate and control the pre-load of the rear shock absorber. It is also noted here that the first and second channels utilize the same pump although the channels are not in fluid communication with each other at the inlet or outlets of the pump. Multiple pumps may also be used. Additional channels may also be added in the same manifold block, such as a three-channel manifold block, or multiple manifold blocks could also be utilized.

With this apparatus, the front shock absorber is a pair of shock absorbers disposed one each in front forks of the two-wheeled vehicle, and the second port provides an equal pressure flow to both of the shock absorbers at the same time. In other words, the front two shock absorber chambers are in fluid communication with each other. It is envisioned here, although not claimed or shown in the figures, that a lock out valve may be used to isolate pressure transfer between the two.

In this second aspect, the controller is also configured to be in communication with a braking system. The controller may, upon an indication of the vehicle braking, modulate the pump and solenoids to control pre-load in the front and rear shock absorbers to reduce brake dive of the vehicle. Additionally a user interface may be utilized to communicate with the controller. Such communications may include wherein a threshold pre-load level is selected by a user. The threshold pre-load level may be selected from a number of pre-programmed threshold levels by the manufacturer as recommend for the make and model of the vehicle the apparatus is on. The controller may then be used to monitor and modulate the pump and solenoids to maintain the threshold pre-load level.

The user may indicate to the system whether they are a light single rider or two riders and cargo. The threshold pre-load levels may correspond to increasing the pre-load of the shock absorbers to a desirable level as selected by the user. These values may be emperical pre-load numbers or they may be referred to simply as light, medium, or stiff, or a graduated level indicator with 10 levels of designation. The threshold pre-load levels may also correspond to values selected from off-road to cruising to performance, increasing the pre-load of the shock absorbers to a desirable level as selected by the user.

The fluid used with the manifold block, solenoids, and pump to provide the adjustable/selectable shock pre-load setting may be a Department of Transportation (DOT) 3, 4, 5, or 5.1 rated motorcycle brake fluid. The manifold block may further define an anti-lock braking circuit and the pump may be used to provide anti-lock modulation of the fluid to the braking system.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
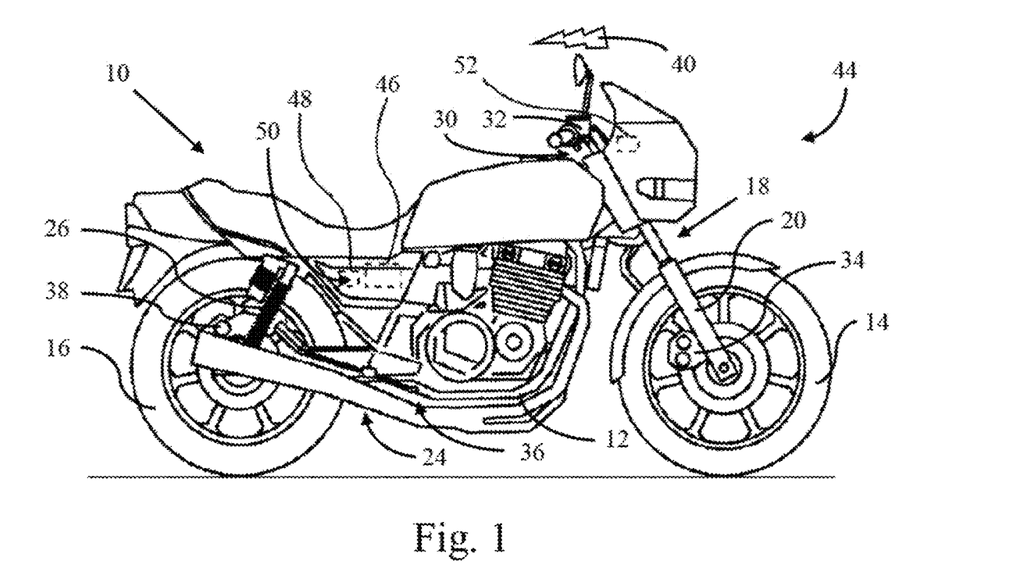
FIG. 1 is a side view of a two-wheeled vehicle.

FIG. 1 shows a two-wheeled vehicle 10, also commonly referred to as a motorcycle. Although a motorcycle is shown, it is also envisioned that the teachings in this disclosure are adaptable and scalable for off road vehicles such as ATVs, SXSs, and Snowmobiles, and on road vehicles such as trucks. SUVs, and crossovers. The motorcycle has a frame 12, a front wheel 14 and a rear wheel 16. The front wheel 14 is connected to the frame 12 by a fork 18. In the fork 18 are front shock absorbers 20, also referred to simply as shocks. In this configuration there are a pair of shock absorbers, one on each side of the two-pronged fork 18. Although a pair of front shock absorbers is the most common, single shock absorber/suspension spring systems have been used. The shock absorbers 20 allow the front wheel 14 to react to imperfections in the road while somewhat isolating the rest of the motorcycle from that motion. The pair of front shock absorbers 20 in the fork 18 provide a front end vehicle suspension.

The rear wheel 16 on this motorcycle is connected to the frame 12 by a swingarm 24 with a pair of rear shock absorbers 26 disposed on each side of the swingarm 24. The swingarm 24 is connected to the frame 12 with bearings (not shown) on one end so that it can pivot, and on the other end is the rear axle around which the rear wheel 16 turns. The swingarm 24 is also connected to the frame 12 with the pair of rear shock absorbers 26, although other single shock absorber rear suspension spring systems have been used. These rear shock absorbers 26, like the front shock absorbers 20 for the front wheel 14, allow the rear wheel 16 to react to imperfections in the road while somewhat isolating the rest of the motorcycle from that motion. The swingarm 24 and rear shock absorbers 26 provide a rear end vehicle suspension.

The motorcycle 10 has a braking system comprising a front hand brake handle 30, a front brake circuit brake fluid reservoir 32, a front caliper 34, a rear brake pedal 36, a rear brake circuit brake fluid reservoir (not shown), and a rear caliper 38, although other braking components, such as drum brakes, may be used. The braking system of this motorcycle is capable of sending a braking signal 40 to indicate when the motorcycle 10 is being braked. The braking system of this motorcycle may be a traditional braking system, an anti-lock braking (ABS) system, or an electronic stability control (ESC) system. The braking signal 40 may be provided by a contact sensor on the front brake handle 30 or rear brake pedal 36, such as that of the rear brake light switch, or the braking signal 40 may come from an ABS or ESC system, such as being a CAN bus signal.

This motorcycle 10 has a shock absorber adjustable pre-load system 44. This system 44 is capable of correspondingly increasing or decreasing pre-load by increasing or decreasing of a fluid to the shock absorber 20. The pre-load adjusting system 44 shown here has a vehicle pre-load adjusting apparatus 46, a reservoir 48 for holding a fluid 50, and a user interface 52. The user interface 52 shown here is located on the handlebar instrument panel, however it is envisioned that the user interface could be anywhere, even wireless such as a user interface thru a wireless device such as a mobile phone.

The reservoir 48 is configured to hold a fluid 50 reserve. The reservoir 48 is shown external to the shock absorbers 20,26, although it is envisioned that a shock absorber could be designed with an internal reservoir 48. The pre-load adjusting apparatus 46 is fluidly connectable to the reservoir 48 to move fluid from the reservoir 48 to the shock absorbers 20, 26, independently, and from the respective shock absorbers 20, 26 back to the reservoir 48. The fluid 50 may be a nearly non-compressible fluid 50. The fluid 50 in the reservoir 48 may be a liquid 50. The fluid 50 may be a DOT 3, 4, 5, or 5.1 rated motorcycle brake fluid. Fluid 50 may be a liquid.

Figure 2:
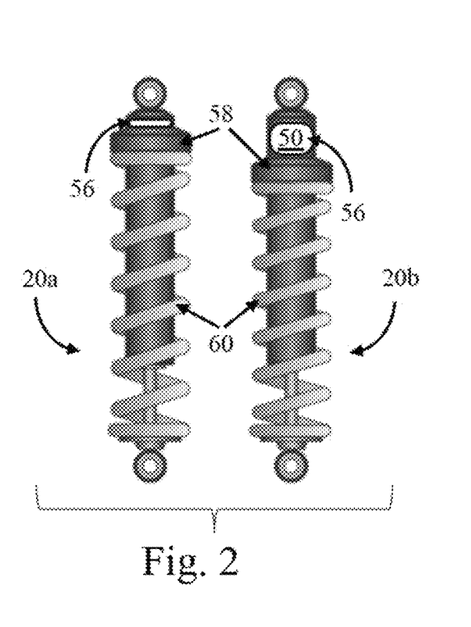
FIG. 2 is a perspective view of a manifold block and controller.

FIG. 2 is a diagrammatic view of two shock absorbers 20. The left shock absorber 20a is in a position of lower pre-load, with the right shock absorber 20b in a position of greater pre-load. Both shock absorbers have an interior expandable chamber 56 containing fluid 50, which moves a collar 58 relative to an end of the shock absorber 20. The left shock 20a has a lower volume of fluid 50 in the chamber 56, and thus the collar 58 is closer to the end of the shock 20. The right shock 20b has a larger volume of fluid 50 in the chamber 56, and thus the collar 58 is further from the end of the shock 20. The collar 58 is adjacent a spring 60, and movement of the collar 58, by increasing or decreasing the fluid volume in the chamber 56, changes the spring factor, or compression, of the spring 60, and thus changes the pre-load of the shock 20. The chamber 56 is in fluid communication with the reservoir 48 thru the pre-load adjusting apparatus 46.

The shock absorber 20 also has a piston hydraulically damped with oil, however springs and dampeners may be separated, like they are on a typical automobile.

The shock absorbers 20 shown here are a coil over design for improved illustration, as also shown in FIG. 1 as a rear shock absorber 26. Front shock absorbers on Motorcycles are typically of an interior spring design, and although the construction differs, the concept of pre-load adjustability remains the same. Further, a shock absorber 20 may be constructed without a physical mechanical spring and use a different medium to act as the suspension and this innovation may be adapted with these different designs so long as the "spring-like" replacing medium can have the spring factor modified by changing its length or physical boundaries.

Please note that the total length of the shock absorber, and as such the total sag, is not substantially changed by the expansion of the chamber 56. Shock absorbers 20a and 20b maintain the same fully extended length as well as the bottomed out compressed length. It is envisioned that this same system, configured slightly differently, could also be used to change the ride height of the vehicle, by having the expansion chamber used to change to total length of the shock absorber 20, without changing the pre-load or total sag. Although the increasing of pre-load can appear to raise a motorcycle, because the weight on the vehicle no longer compresses the spring as much as the spring factor is raised, an expandable chamber that changes the length of the shock absorber without changing the pre-load or sag would truly change the ride height of the vehicle. This could be useful in motorcycles for different height riders. This could be useful in four wheel vehicles to raise a vehicle for city street use after having it lower at the track, or raise the bottom of a vehicle up when transitioning to an off-road use after having it lower for the city streets.

Figure 3:
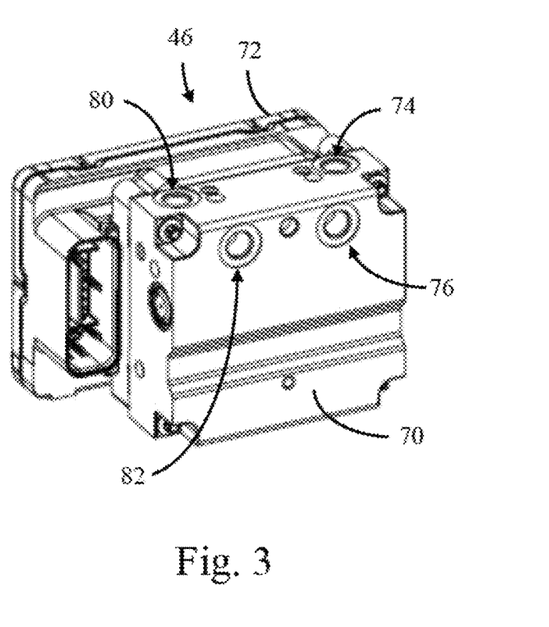
FIG. 3 is a diagrammatic view of two motorcycle shock absorbers, the left shock with the chamber having less fluid, and thus less pre-load, and the right shock with the chamber having more fluid, and thus more pre-load.

FIG. 3 shows a representative pre-load adjusting apparatus 46 having a manifold block 70 and a controller 72 connected thereto. The manifold block 70 has a first port 74 configured to be fluidly connect to the reservoir 48 (see FIG. 1). The manifold block 70 has a second port 76 configured to be fluidly connected to the front shock absorber 20 (see FIG. 1). The manifold block 70 also defines a number of fluid passages 78 (see FIGS. 4 and 5) between the first and second ports 74, 76. In the case of a single channel manifold block, there would only be these two ports. However, in a two-channel manifold block, there are an additional pair of ports.

The manifold block 70 shown here has a third port 80 configured to be fluidly connect to the reservoir 48 and a fourth port 82 configured to be fluidly connected to the rear shock absorber 26 (see FIG. 1). The manifold block 70 also defines a second number of fluid passages 84 between the third and fourth ports 80, 82 (see FIGS. 4 and 5). The second set of fluid passages 84 are separate and distinct from the first set of fluid passages 78, or said another way, the first and second set of fluid passages 78, 84 are not in fluid communication with each other.

Figure 4:
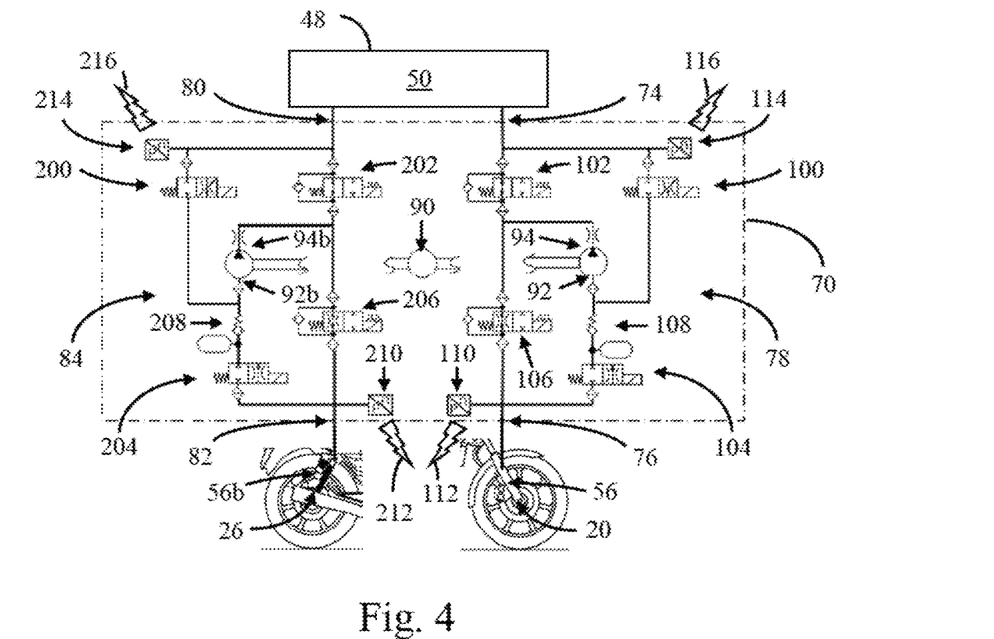
FIG. 4 is a schematic example of a two-channel manifold block used with both a front and rear shock absorber, and the relative fluid flow locations of the pump and solenoid valves.

FIG. 4 provides a schematic of the fluid flow of one embodiment of a pre-load system thru a manifold block 70. A pump 90 is at least partially disposed within the manifold block 70. The pump 90 is in fluid communication with the chamber 56 of the front shock absorber 20 thru the second port 76. The pump 90 is also in fluid communication with the reservoir 48 thru the first port 74. Said another way, the pump 90 is disposed between the chamber 56 of the front shock absorber 20 and the reservoir 48. More specifically, the pump 90 has an inlet 92 in fluid communication with the number of fluid passages 78, and an outlet 94 also in fluid communication with the number of fluid passages 78.

Pump 90, when activated, is configured to move fluid in the number of fluid passages 78, and more specifically, move fluid from the reservoir 48 to the chamber 56 in the front shock absorber 20 and back again. Pump 90 has a motor speed capability of 5000 rpm, although 1500 rpm to 3000 rpm is most common in operation. Pump 90 also has the capability to produce pressures up to and exceeding 100 bar, although pressures from 0 to 40 Bar are most common in operation. The movement of the fluid is controlled by a number of solenoid valves which open and close in the fluid passages 78.

A first solenoid valve 100 is fluidly disposed in the first number of fluid passages 78. It is disposed between the reservoir 48, thru first port 74, and the inlet 92 of the pump 90. The solenoid valve is a combination of an electrical component (the solenoid) and a fluid valve component. A normally open solenoid valve has an open fluid valve element allowing flow thru the channel until the solenoid is energized closing the valve and restricting fluid flow. A normally closed solenoid valve has a closed fluid valve restricting flow until the solenoid is energized opening the valve and allowing flow. All of the electrical components (the solenoids) of the solenoid valves are in communication with the controller 72 (see FIG. 3) and the controller controls when they are energized to either open or close their respective fluid valve components.

Solenoid valve 100 is in fluid communication with the reservoir 48, thru the first port 74, and in fluid communication with the inlet 92 of the pump 90. Solenoid valve 100 is a normally closed valve restricting fluid flow, until energized, from the reservoir 48 to the pump 90. Solenoid valve 100 is configured to, when opened by the controller, allow the pump 90 to draw fluid flow from the reservoir 48.

A second solenoid valve 102 is fluidly disposed in the first number of fluid passages 78 between the outlet 94 of the pump and the reservoir 48, thin the first port 74. The second solenoid valve 102 is a normally open solenoid valve and is configured to, when closed by the controller, separate fluid flow from the outlet 94 of the pump to the reservoir 48. A first by-pass check valve allows flow from the first port 74 toward the outlet 94 of the pump 90 even when the solenoid valve 102 is closed.

A third solenoid valve 104 is fluidly disposed in the first number of fluid passages 78 between the chamber 56 of the front shock absorber 20, thru the second port 76, and the inlet 92 of the pump 90. The third solenoid valve 104 is a normally open solenoid valve configured to, when closed by the controller, separate flow from the shock absorber 20, thru the second port 76 to the pump 90.

A fourth solenoid valve 106 is fluidly disposed in the first number of fluid passages 78 between the outlet 94 of the pump and the chamber 56 in the front shock absorber 20. Solenoid valve 106 is a normally open solenoid valve and is configured to, when closed by the controller, separate fluid flow from the pump 90 to the chamber 56 in the front shock absorber 20. A second by-pass check valve allows back flow from the second port 76 toward the outlet 94 of the pump 90 even when the solenoid valve 102 is closed.

Thus the controller 72, thru manipulation of the solenoids 100, 102, 104, 106, can control the flow of fluid in the first number of fluid passages 78. To charge chamber 56 in the front shock absorber 20, the controller 72 engages the pump and engages the first solenoid 100, opening it, allowing fluid to be pulled from the reservoir 48. The controller also engages the third solenoid 104, closing it and closing off suction from the chamber 56 in the front shock absorber 20. Then also the controller engages the second solenoid 102, closing it, restricting fluid flow from returning to the reservoir. The fourth solenoid 106 is not energized, as it is normally open, and the fluid flow pulls from the reservoir 48 and into the chamber 56 of the front shock absorber 20 thus increasing the volume of the fluid 50 in the chamber and increasing the pre-load of the shock absorber 20.

Conversely, the flow is reversible. To move fluid 50 from the chamber 56 in the front shock absorber 20 to the reservoir 48, thus decreasing the volume of fluid 50 in the chamber and decreasing the pre-load, the controller 72 energizes the pinup 90 and energizes the fourth solenoid 106. With no power to the first solenoid 100 it closes, and with no power to the third solenoid it opens, providing suction from the inlet 92 of the pump 90 to pull only from the chamber 56. On the outlet side 94 of the pump 90 since the fourth solenoid is energized and closed, while the second solenoid has no power being supplied leaving it open, the fluid 50 most flow from the pump back to the reservoir 48. When the system is off, the second solenoid 102 and the fourth solenoid 106 are open and the fluid 50 is allowed to move between the chamber 56 and the reservoir 48, thus having no impact or modification to the factory pre-load settings.

In this embodiment, a first one-way check valve 108 fluidly disposed in the number of fluid passages 78 between the third solenoid valve 104 and the inlet 92 of the pump 90. This first one-way check valve 108 is configured to allow flow in only one direction, from the third solenoid valve 104 to the pump 90, preventing back flow thru the third solenoid 104 valve to the second port 76.

A first pressure sensor 110 is fluidly disposed in the first number of fluid passages 78 proximate the second port 76 and is in fluid communication with the chamber 56 of the front shock absorber 20. The first pressure sensor 110 is configured to send a first pressure signal 112 to the controller 72. It is configured to provide a pressure signal 112 corresponding to a pressure of the fluid 50 in the front shock absorber 20.

A first reservoir pressure sensor 114 is fluidly disposed in the first number of fluid passages 78 proximate the first port 74 and is in fluid communication with the reservoir 48. The first reservoir pressure sensor 114 is configured to send a first reservoir pressure signal 116 to the controller 72. It is configured to provide a pressure signal 116 corresponding to a pressure of the fluid 50 in the reservoir 48 (or in the first half of the reservoir if separated).

The manifold block 70 is a two-channel manifold block 70, and thus has a second number of fluid passages 84 between the third port 80 and fourth port 82. The third port 80 is in fluid communication with the reservoir 48, similar to the first port 74. The fourth port 82 is in fluid communication with a chamber 56b in the rear shock absorber 26. Although shown in this embodiment to be the same reservoir 48 accessed by both channels 78, 84, the system may have two separate reservoirs or if the same reservoir, there may be a half wall separating the first and third ports if fluid gets low (similar to the reservoir of a brake master cylinder for a split braking system in an automobile).

A fifth solenoid valve 200 is fluidly disposed in the second number of fluid passages 84. The fifth solenoid valve 200 is similar to the first solenoid valve 100 in the first number of fluid passages 78. It is disposed between the third port 80 and the inlet 92b of the pump 90. The fifth solenoid valve 200 is configured to control fluid flow between the reservoir 48 and the inlet 92b of the pump 90. A sixth solenoid valve 202 is fluidly disposed in the second number of fluid passages 84, similar to the second solenoid valve 102 in the first number of fluid passages 78, between the outlet 94b of the pump 90b and the third port 80. The sixth solenoid valve 202 is configured to control fluid flow between the outlet 94b of the pump 90 and the reservoir 48.

A seventh solenoid valve 204 is fluidly disposed in the second number of fluid passages 84, similar to the third solenoid valve 104 in the first number of fluid passages 78, between the fourth port 82 and the inlet 92b of the pump 90. The seventh solenoid valve 204 is configured to control fluid flow between the chamber 56b of the rear shock absorber 26 and the inlet 92b of the pump 90. An eighth solenoid valve 206 is fluidly disposed in the second number of fluid passages 84, similar to the fourth solenoid valve 106 in the first number of fluid passages 78, between the outlet 94b of the pump 90 and the fourth port 82. The eighth solenoid valve 206 is configured to control fluid flow between the outlet 94b of the pump 90b and the chamber 56b of the rear shock absorber 26.

A second pressure sensor 210 is fluidly disposed in the second number of fluid passages 84 proximate the fourth port 82 configured to provide a second pressure signal corresponding to a pressure of the fluid 50 in the chamber 56b of the rear shock absorber 26. A second reservoir pressure sensor 214 is also fluidly disposed in the second number of fluid passages 84 proximate the third port 80 and is in fluid communication with the reservoir 48. The second reservoir pressure sensor 214 is configured to send a second reservoir pressure signal 216 to the controller 72. It is configured to provide a pressure signal 216 corresponding to a pressure of the fluid 50 in the reservoir 48 (or in the second half of the reservoir if separated). The first and second set of fluid passages 78, 84, in this embodiment, share the same pump 90 and the same reservoir 48, but are not in fluid communication with each other.

Referring back to previous figures, a controller 72 (see FIG. 3) is connected to the system and is in communication with the pump 90, all of the pressure sensors 110, 114, 210, 216, and all of the solenoids 100, 102, 104, 106, 200, 202, 204, 206. The controller 72 is configured to receive signals 40 (see FIG. 1), 112, 116, 212, 216, and engage the solenoid valves 100, 102, 104, 106, 200, 202, 204, 206 and the pump 90 to move fluid 50 in the number of fluid passages 78, 84 to modulate and control the pre-load of the shock absorbers 20, 26. The controller 72 is configured to, upon receiving an activation signal, engage the pump to move fluid 50 into a chamber 56. Such a signal may be a braking signal 40. Specifically, the controller 72 is configured to be in communication with the braking system and upon an indication of the vehicle braking, modulate the pump 90 and solenoid valves 100, 102, 104, 106, 200, 202, 204, 206 to control the pre-load in the front and rear shock absorbers 20, 26 to reduce brake dive of the vehicle 10. Such a signal may also be a pressure signal 112, 212, indicating a drop of pressure in a chamber 56, 56b from a threshold level.

Referring back to FIG. 1, a user interface 52, which is also in communication with the controller 72, may be used by a rider to set certain parameters of the system. A rider may use the user interface 52 to activate the pump 90 (and the proper set of solenoid valves) to raise or lower the pre-load of either shock absorber 20, 26. A threshold level may be selected by the user from a number of threshold levels and the controller may modulate the pump and solenoids to maintain the threshold pre-load level, or pre-load feel.

The threshold values may correspond to values selected from the group consisting of on-road or off-road riding. For example, a rider could preset the pre-load feel they enjoy, ride their enduro motorcycle on the streets with an on-road pre-load, and then lower it at the trail-head to an off-road setting. The threshold values may correspond to values selected from the group consisting of performance or easy-riding/cruising. For example, a rider could ride their cafe motorcycle on the streets with an easy-riding pre-load, and then raise it even more at the track to a performance setting. Additionally, threshold values may correspond to values selected from the group consisting of loaded and un-loaded. A rider could ride their delivery motorcycle with a loaded pre-load setting, and then lower the pre-load once the delivery has been made and they are returning to the shop.

Threshold pre-load levels could also correspond to weight added to the vehicle from a light single rider to two riders and cargo, increasing the pre-load of the shock absorbers to a desirable level. This could be manually selected by the user through the user interface, or the motorcycle could have additional sensors that recognize different loading scenarios while the vehicle is not moving and automatically adjust the pre-load to compensate.

Figure 5:
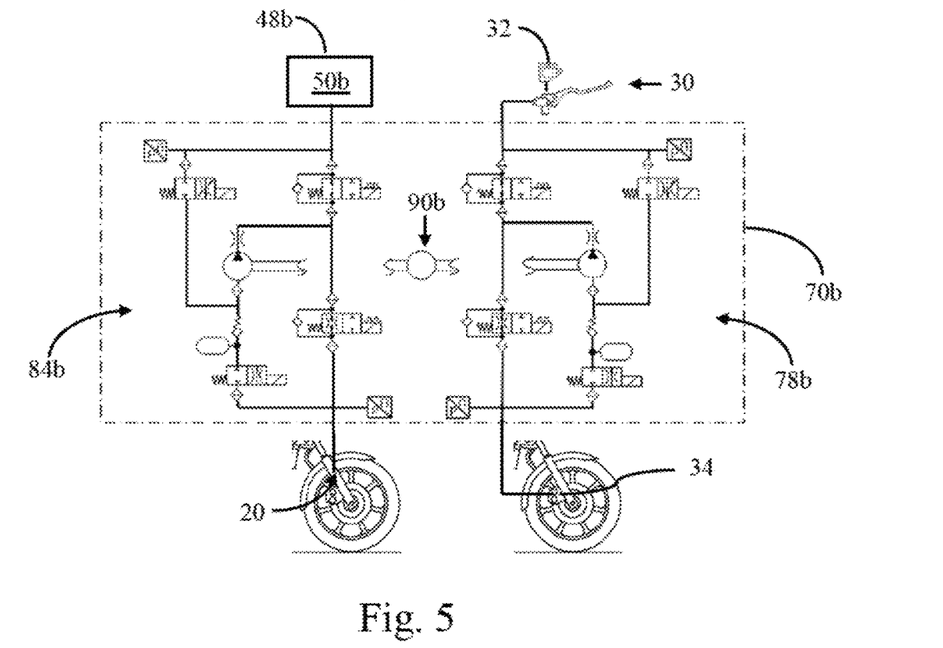
FIG. 5 is a is a schematic example of a two-channel manifold block where the first channel is an anti-lock braking circuit connected to a front caliper and the second channel is a shock pre-load circuit connected to a front shock absorber.

FIG. 5 is a schematic diagram of a two-channel manifold block 70b with the first channel 78b being used for an anti-lock braking circuit for a front brake 34, and the second channel 84b is being used for a pre-load control circuit for the front shock absorber 20. The anti-lock braking system and pre-load control system utilize the same pump 90b, controller 72b (not shown), and manifold block 70b. Although the control of the solenoids may be different in the anti-lock braking system, as well as the sensor inputs, the same pump 90b and manifold block 70b may be used. This embodiment could not only prevent a wheel lock up during a hard front braking, it could also significantly reduce the brake dive of the motorcycle improving the safety of a hard braking moment.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A pre-load adjusting apparatus for shock absorbers on a two-wheeled vehicle, the shock absorbers capable of correspondingly increasing or decreasing pre-load with the increasing or decreasing of fluid to the shock absorbers, and a reservoir external to the shock absorbers for holding fluid reserves, comprising:

a manifold block having a first port configured to be fluidly connected to the reservoir, a second port configured to be fluidly connected to a front shock absorber of the shock absorbers, and defining a number of fluid passages therebetween;

a pump having an inlet and an outlet in fluid communication with the number of fluid passages, the pump configured to, when activated, move fluid in the number of fluid passages;

a first solenoid valve fluidly disposed in the number of fluid passages between the first port and the inlet of the pump, configured to control fluid flow between the reservoir and the inlet of the pump;

a second solenoid valve fluidly disposed in the number of fluid passages between the outlet of the pump and the first port, configured to control fluid flow between the outlet of the pump and the reservoir;

a third solenoid valve fluidly disposed in the number of fluid passages between the second port and the inlet of the pump, configured to control fluid flow between the front shock absorber and the inlet of the pump;

a fourth solenoid valve fluidly disposed in the number of fluid passages between the outlet of the pump and the second port, configured to control fluid flow between the outlet of the pump and the front shock absorber;

a pressure sensor fluidly disposed in the number of fluid passages proximate the second port, configured to provide a pressure signal corresponding to a pressure of the fluid in the front shock absorber;

a controller in communication with the pressure sensor, the first, second, third, and fourth solenoid valves, and the pump, configured to receive the pressure signal and engage the solenoid valves and the pump to move fluid in the number of fluid passages to control the pre-load of the front shock absorber;

the manifold block having a third port configured to be fluidly connect to the reservoir, a fourth port configured to be fluidly connected to a rear shock absorber of the shock absorbers, and defining a second number of fluid passages therebetween and in find communication with the pump;

a fifth solenoid valve fluidly disposed in the second number of fluid passages between the third port and the inlet of the pump, configured to control fluid flow between the reservoir and the inlet of the pump;

a sixth solenoid valve fluidly disposed in the second number of fluid passages between the outlet of the pump and the third port, configured to control fluid flow between the outlet of the pump and the reservoir;

a seventh solenoid valve fluidly disposed in the second number of fluid passages between the fourth port and the inlet of the pump, configured to control fluid flow between the rear shock absorber and the inlet of the pump;

an eighth solenoid valve fluidly disposed in the second number of fluid passages between the outlet of the pump and the fourth port, configured to control fluid flow between the outlet of the pump and the rear shock absorber; and a second pressure sensor fluidly disposed in the second number of fluid passages proximate the fourth port, configured to provide a pressure signal corresponding to a pressure of the fluid in the rear shock absorber, wherein the controller in communication with the second pressure sensor, the fifth, sixth, seventh, and eighth solenoid valves, and the pump is configured to receive signals and engage the solenoids and pump to move fluid in the second number of fluid passages to modulate and control the pre-load of the rear shock absorber.

2. The pre-load adjusting apparatus of claim 1, further comprising a one-way check valve fluidly disposed in the number of fluid passages between the third solenoid valve and the inlet of the pump, configured to allow flow in only one direction and preventing back flow thru the third solenoid valve to the second port.

3. The pre-load adjusting apparatus of claim 1, wherein the front shock absorber is a pair of shock absorbers disposed one each in front forks of the two-wheeled vehicle.

4. The pre-load adjusting apparatus of claim 1, wherein the controller is configured to be in communication with a braking system, and the controller is configured to, upon an indication of the vehicle braking, modulate the pump and solenoids to control pre-load in the front and rear shock absorbers to reduce brake dive of the vehicle.

5. The pre-load adjusting apparatus of claim 1, further comprising a user interface in communication with the controller, wherein a threshold pre-load level is selectable by a user from a number of threshold levels and the controller modulates the pump and solenoids to maintain the threshold pre-load level.

6. The pre-load adjusting apparatus of claim 5, wherein the threshold pre-load levels are a number pre-load values corresponding to weight added to the vehicle from a light single rider to two riders and cargo, increasing the pre-load of the shock absorbers to a desirable level as selected by the user.

7. The pre-load adjusting apparatus of claim 5, wherein the threshold pre-load levels are a number of pre-load values correspond to values selected from off-road to cruising to performance, increasing the pre-load of the shock absorbers to a desirable level as selected by the user.

8. The pre-load adjusting apparatus of claim 1, wherein the fluid is DOT 3, 4, 5, or 5.1 motorcycle brake fluid.

9. A pre-load adjusting apparatus for a shock absorber on a vehicle, the shock absorber capable of corresponding increasing or decreasing pre-load with the increasing or decreasing of fluid to the shock absorber, and a reservoir external to the shock absorber for holding fluid reserves, comprising:

a manifold block having a first port configured to be fluidly connected to the reservoir, a second port configured to be fluidly connected to the shock absorber, and defining a number of fluid passages therebetween;

a pump having an inlet and an outlet in fluid communication with the number of fluid passages, the pump configured to, when activated, move fluid in the number of fluid passages;

a first solenoid valve fluidly disposed in the number of fluid passages between the first port and the inlet of the pump, configured to control fluid flow between the reservoir and the inlet of the pump;

a second solenoid valve fluidly disposed in the number of fluid passages between the outlet of the pump and the first port, configured to control fluid flow between the outlet of the pump and the reservoir;

a third solenoid valve fluidly disposed in the number of fluid passages between the second port and the inlet of the pump, configured to control fluid flow between the shock absorber and the inlet of the pump;

a fourth solenoid valve fluidly disposed in the number of fluid passages between the outlet of the pump and the second port, configured to control fluid flow between the outlet of the pump and the shock absorber;

a pressure sensor fluidly disposed in the number of fluid passages proximate the second port, configured to provide a pressure signal corresponding to a pressure of the fluid in the shock absorber;

a controller in communication with the pressure sensor, the first, second, third, and fourth solenoid valves, and the pump, configured to receive the pressure signal and engage the solenoid valves and the pump to move fluid in the number of fluid passages to control the pre-load of the shock absorber, wherein the manifold block further defines an anti-lock braking circuit and the pump provides anti-lock modulation of the fluid to a braking system.

* * * * *